United States Patent
Bruhn et al.

(10) Patent No.: US 9,794,308 B2
(45) Date of Patent: Oct. 17, 2017

(54) SYSTEMS AND METHODS FOR HANDLING INTERRUPTIONS IN RECEIVING MEDIA CONTENT DUE TO A CHANGE IN WIRELESS FREQUENCY CHANNEL

(71) Applicant: EchoStar Technologies L.L.C., Englewood, CO (US)

(72) Inventors: Christopher William Bruhn, Aurora, CO (US); Harold Jaramillo, Castle Rock, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 249 days.

(21) Appl. No.: 14/641,088

(22) Filed: Mar. 6, 2015

(65) Prior Publication Data

US 2016/0261657 A1   Sep. 8, 2016

(51) Int. Cl.
*H04L 29/06* (2006.01)
*H04L 12/853* (2013.01)
*H04L 29/08* (2006.01)
*H04L 12/861* (2013.01)

(52) U.S. Cl.
CPC ...... *H04L 65/4069* (2013.01); *H04L 47/2416* (2013.01); *H04L 67/28* (2013.01); *H04L 49/90* (2013.01)

(58) Field of Classification Search
CPC . H04W 72/0453; H04W 84/12; H04W 36/06; H04W 36/02; H04L 12/2805; H04L 65/4069; H04L 47/2416; H04L 67/28; H04L 49/90
See application file for complete search history.

(56) References Cited

U.S. PATENT DOCUMENTS

| | | | |
|---|---|---|---|
| 7,373,140 B1 * | 5/2008 | Matsumoto | G08B 5/225 379/201.01 |
| 7,623,060 B1 * | 11/2009 | Chhabra | G01S 7/021 342/20 |
| 8,238,318 B1 * | 8/2012 | Negus | H04W 84/12 370/310 |
| 9,635,649 B1 * | 4/2017 | Amiri | H04W 72/0406 |
| 2006/0242457 A1 * | 10/2006 | Roy | H04W 36/06 714/12 |
| 2007/0230423 A1 * | 10/2007 | Yoshida | H04W 76/02 370/338 |
| 2009/0160696 A1 * | 6/2009 | Pare | G01S 7/021 342/20 |

(Continued)

*Primary Examiner* — Douglas Blair
(74) *Attorney, Agent, or Firm* — Seed IP Law Group LLP (57) ABSTRACT

To address a service interruption while a procedure to change to a dynamic frequency selection (DFS) wireless frequency channel is being performed, a service interruption message is displayed to the user or some other action is taken while a wireless access point changes to the DFS wireless frequency channel. Another action to address the service interruption may be the media content client playing buffered media content stored in a buffer on the media content client to avoid an appearance to the user of an interruption in service. Also, in some embodiments, buffered video is received from the receiving device after the interruption in service has ended so that the media content client may resume playing, and the user may continue to view, the video program from the point where the user left off when the DFS change process and service interruption had started.

21 Claims, 7 Drawing Sheets

(56) References Cited

U.S. PATENT DOCUMENTS

| | | | |
|---|---|---|---|
| 2009/0201851 A1* | 8/2009 | Kruys | H04W 16/14 370/328 |
| 2010/0135226 A1* | 6/2010 | Chandramouli | H04W 36/02 370/329 |
| 2011/0116415 A1* | 5/2011 | Naito | H04W 76/02 370/254 |
| 2012/0258749 A1* | 10/2012 | Lenzini | H04W 16/14 455/509 |
| 2014/0003237 A1* | 1/2014 | Kenney | H04W 28/10 370/235 |
| 2014/0090003 A1* | 3/2014 | Eguchi | H04L 65/4076 725/116 |
| 2014/0253361 A1* | 9/2014 | Rezk | G01S 7/021 342/16 |
| 2016/0087897 A1* | 3/2016 | Hardt | H04L 47/122 370/237 |

* cited by examiner

SYSTEMS AND METHODS FOR HANDLING INTERRUPTIONS IN RECEIVING MEDIA CONTENT DUE TO A CHANGE IN WIRELESS FREQUENCY CHANNEL

TECHNICAL FIELD

The technical field relates to wireless media and more particularly, to handling interruptions in receiving wireless media content.

BRIEF SUMMARY

Traditionally, when a wireless access point had to change to a Dynamic Frequency Selection (DFS) channel on a wireless network, the client receiving media content on the wireless network provided by the wireless access point would lose connection to the wireless access point and hence not receive media content for over a minute. As a result, when the media content service over the wireless network resumed, the user had missed a minute of content. Users would not be aware of what is going on and this could trigger service calls. The systems and methods disclosed herein for handling interruptions in receiving media content due to this change to a DFS wireless frequency channel provide a better user experience by displaying a service interruption message to the user or taking some other action to address the service interruption while the procedure to change to the DFS channel is being performed.

For example, this other action to address the service interruption may be the media content client playing buffered media content stored in a buffer on the media content client to avoid an appearance to the user of an interruption in service. Also, in some embodiments, buffered video is received from the receiving device after the interruption in service has ended so that the media content client may resume playing, and the user may continue to view, the video program from the point where the user left off when the DFS change process and the resulting interruption in service had started.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
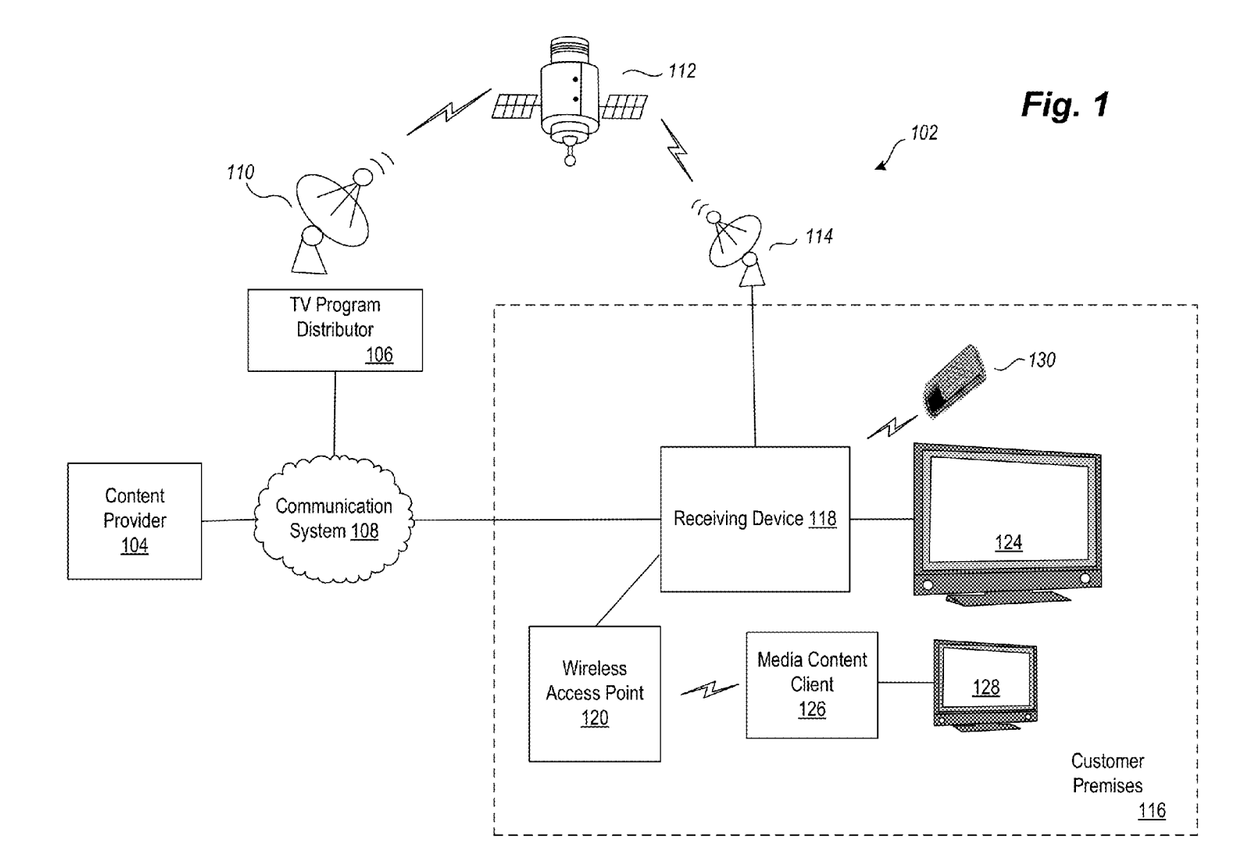
FIG. 1 is a block diagram illustrating an example content distribution environment in which embodiments of systems and methods for handling interruptions in receiving media content due to a change in wireless frequency channel may be implemented, according to one embodiment.

FIG. 1 is a block diagram illustrating an example content distribution environment 102 in which embodiments of systems and methods for handling interruptions in receiving media content due to a change in wireless frequency channel may be implemented. Shown in FIG. 1 is a receiving device 118 operably connected to a communication system 108, a presentation device 124 and a wireless access point 120. The receiving device 118, which may be, for example, a set-top box, can use a wireless local area network (WLAN) such as one based on the Institute of Electrical and Electronics Engineers' (IEEE) 802.11 standards (Wi-Fi) to distribute media content, such as video, audio or graphics data, via wireless access point 120 to a media content client 126. In various embodiments, there may be multiple media content clients, such as media content client 126, in communication with the receiving device via wireless access point 120. The connection between the receiving device 118 and the wireless access point 120 may be a wired or wireless connection. Also, in some alternative embodiments, the wireless access point 120 may be part of the receiving device 118.

An auto-channel module may operate on the wireless access point 120 that dynamically changes the Wi-Fi channel of the network provided by the wireless access point 120 in order to avoid interference. Some of these Wi-Fi channels may be Dynamic Frequency Selection (DFS) channels. DFS is a spectrum-sharing mechanism that allows WLANs to coexist with radar systems. It selects a frequency that does not interfere with certain radar systems while operating in the 5 GHz band in which many radar systems also operate. DFS is a feature of European Telecommunications Standards Institute (ETSI) Broadband Radio Access Networks (BRAN) HIPERLAN/2 and the Institute of Electrical and Electronics Engineers (IEEE) Standard 802.11h.

Currently, there are only two 80 MHz Wi-Fi channels that are not DFS channels. If the wireless access point 120 determines those two channels become unacceptable, the auto-channel module used by the wireless access point 120 will determine to change to a DFS channel. However, DFS channels require the wireless access point 120 to perform a procedure to change to a DFS channel, including a scan to ensure the new frequency is free of radar signals before communication can occur on the DFS channel. This scan typically takes about a minute.

Therefore, previously, when the wireless access point 120 had to change to a DFS Wi-Fi channel, the media content client 126 would lose connection to the wireless access point 120 and hence not provide media content (e.g., provide video) for over a minute and when the media content service from the receiving device 118 resumed, the user had missed a minute of content. This would cause users to not be aware of what is going on and trigger service calls. The systems and methods disclosed herein for handling interruptions in receiving media content due to a change in wireless frequency channel provide a better user experience by displaying a service interruption message to the user or taking some other action to address the service interruption while the procedure to change to a DFS channel is being performed.

Before providing additional details regarding the operation and constitution of the system for handling interruptions in receiving media content due to a change in wireless frequency channel, the content distribution environment 102 of the systems and methods disclosed herein will be described.

In the content distribution environment 102, audio, video, and/or data service providers, such as, but not limited to, television service providers, provide their customers a multitude of television (TV) programming. Such TV programming is often provided by use of a receiving device 118 communicatively coupled to a presentation device 124 configured to receive the TV programming.

The receiving device 118 interconnects to one or more communications media or sources (such as a cable head-end, satellite antenna, telephone company switch, Ethernet portal, off-air antenna, or the like) that provide the TV programming. The receiving device 118 commonly receives a plurality of TV programming on various TV channels by way of the communications media or sources described in greater detail below. Based upon selection by a user, the receiving device 118 processes and communicates the selected TV programming to the presentation device 124. For example, the receiving device 118 may be, or be part of, a device such as a television converter, set-top box, television receiving device, television recording device, satellite set-top box, satellite receiving device, cable set-top box, cable receiving device, media player, mobile device, smart phone, computer, tablet device, and/or television tuner. Accordingly, the receiving device 118 may be any suitable converter device or electronic equipment that is operable to receive or playback TV programming.

Further, the receiving device 118 may itself include user interface devices, such as buttons or switches to provide user control of the receiving device and the functionalities described herein. In many applications, a remote-control device (remote) 130 is operable to control the receiving device 118 and/or the presentation device 124. The remote 130 typically communicates with the receiving device 118 using a suitable wireless medium, such as infrared (IR), radio frequency (RF), or the like.

Examples of a presentation device 124 include, but are not limited to, a television (TV), a personal computer (PC), a sound system receiving device, a mobile device, a game system, or the like. Presentation devices 124 may employ a display, one or more speakers, and/or other output devices to communicate video and/or audio content to a user. In many implementations, one or more presentation devices 124 reside in or near a customer's premises 116 and are communicatively coupled, directly or indirectly, to the receiving device 118. Further, the receiving device 118 and the presentation device 124 may be integrated into a single device. Such a single device may have the above-described functionality of the receiving device 118 and the presentation device 124, or may even have additional functionality.

A content provider 104 provides TV program content to a distributor, such as the TV program distributor 106. Example content providers include television stations which provide local or national television programming, special content providers which provide on-demand TV programming, premium based TV programming and/or pay-per-view TV programming.

TV program content, also referred to herein as TV programming or content of TV programs, is communicated to the TV program distributor 106 from the TV content provider 104 through suitable communication media providing various communication TV channels, generally illustrated as communication system 108 for convenience. Communication system 108 may include many different types of communication media, now known or later developed. Non-limiting media examples include telephony systems; the Internet; internets; intranets; local area network (LAN) systems; Internet Protocol (IP) systems; terrestrial television systems; digital terrestrial television (DTTV) systems; digital television terrestrial broadcasting (DTTB) systems; cable systems; fiber optic systems; microwave systems; asynchronous transfer mode (ATM) systems; frame relay systems; digital subscriber line (DSL) systems; Digital Video Broadcasting (DVB) systems over cable, satellite, terrestrial and mobile networks, including, but not limited to, Digital Video Broadcasting-Cable (DVB-C or DVB-C2), Digital Video Broadcasting-Satellite (DVB-S), Digital Video Broadcast-Satellite services to Handheld, (DVB-SH), Digital Video Broadcast-Return Satellite via Satellite (DVB-RCS), Digital Video Broadcasting-Terrestrial (DVB-Tor DVB-T2), Digital Video Broadcasting-Handheld (DVB-H) and other variants; Direct-broadcast Satellite (DBS) systems; direct-to-home signals (DTH); Advanced Television Systems Committee (ATSC) systems; Digital Terrestrial Multimedia Broadcasting (DTMB) systems; Data Over Cable Service Interface Specification (DOCSIS) and EuroDOCSIS systems; and other radio frequency ("RF") systems and satellite systems.

In at least one embodiment, the received TV program content is converted by the TV program distributor 106 into a suitable signal (i.e., a "program signal") that is communicated (i.e., "uplinked") by one or more antennae 110 to one or more satellites 112 (separately illustrated herein from, although considered part of, the communication system 108). The communicated uplink signal may contain a plurality of multiplexed programs. The uplink signal is received by the satellite 112 and then communicated (i.e., "downlinked") from the satellite 112 in one or more directions, for example, onto a predefined portion of the planet.

A receiving device antenna 114 that is within reception range of the downlink signal communicated from satellite 112 receives the above-described downlink signal. The receiving device antenna 114 can be located at customer premises 116. Examples of customer premises 116 include a residence, a business, or any other suitable location operable to receive signals from satellite 112. The received signal is communicated, typically over a hard-wire connection, to a receiving device 118. The receiving device 118 converts the received signal from antenna 114 into a signal and/or format suitable for communication to a presentation device 124 or another device, such as media content client 126, presentation device 128, another digital video recorder (not shown), and/or a home computing system (not shown).

For example, receiving device 118 may be a digital receiving device with an RF network interface (e.g., satellite, terrestrial, or cable) that tunes to the RF channel and rejects signals from other RF channels, demodulates the signals to a bit-stream then de-multiplexes the packets and filters for the packets carrying the elementary streams of the TV channel and other data for decryption, decoding and presentation as a service. In some embodiments, the receiving device may typically process only the packets of the elementary stream for the TV channels being watched or recorded. A digital receiving device with an RF network interface, in some embodiments, may have one or multiple tuners and demodulators, each capable of selecting a single RF channel and converting it into a bit stream or it may have a wide band tuner/demodulator capable of demodulating the bit-streams from several RF channels simultaneously. These one or multiple bit-streams are then de-multiplexed and filtered to provide one or multiple elementary streams which are used to reconstruct the TV channels, Radio TV channels, data services (i.e., services or programs) using metadata (e.g., the Program Map Table (PMT)) transmitted alongside the elementary streams that map the elementary streams into programs (i.e., services or TV channels). For example, the PMT may provide information to the receiving device 118 regarding which packet identifiers (IDs) to filter in order for the receiving device 118 to collect the packets of the elementary stream belonging to that program (i.e., TV channel).

The receiving device 118 may have one or more presentation interfaces to output the same or multiple services to one or multiple display devices, such as presentation device 124. The receiving device 118 may have a recording capability (such as the buffering module 311 shown in FIG. 3) to buffer the data of the elementary streams of a service for subsequent presentation or forwarding. The receiving device 118 may have a network interface, such as the network connections 306 shown in FIG. 3, to forward a service to a remote presentation device for presentation, to a remote recording device for buffering and/or to a wireless access point for distribution to a media content client for presentation on a connected display integrated with or connected to such a client. In the present example embodiment, receiving device 118 forwards TV programming services to media content client 126 via wireless access point 120 over a Wi-Fi connection between wireless access point 120 and the media content client 126. Although not shown, receiving device 118 may forward TV programming services individually to multiple media content clients over a Wi-Fi connection between wireless access point 120 and the respective media content clients.

In some embodiments, the receiving device 118 may be a digital receiving device with an Internet Protocol (IP) network interface that is similar to a digital receiver with a RF network interface, but it does not need the RF tuning and demodulation capability, except in some cases such as where the IP interface is a Data Over Cable Service Interface Specification (DOCSIS) cable modem interface. Packets are received through the IP interface of the receiving device 118 and are filtered to extract the elementary streams of the services to be received.

An IP digital receiver further differs from a digital receiver with a RF network interface because the IP interface is a two way communication TV channel enabling the receiving device 118 to communicate with the devices upstream of the network interface to select different services to be sent over the IP network or to pause, fast forward or rewind the services sent, and to collaborate with upstream devices to implement buffering and playback of content by devices upstream before they are sent to the receiving device 118.

The media content client 126 may have some or all the functionality described above of the receiving device 118. For example, the media content client 126 may be or include an IP digital receiver that has an IP interface that is a two way communication TV channel enabling the media content client 126 to communicate with the receiving device 118 via the wireless access point 120 over a network interface to select different services to be sent via the wireless access point 120 and/or to pause, fast forward or rewind the services sent from the receiving device 118. The media content client 126 may also use this IP interface to collaborate with the receiving device 118 to implement buffering and playback of the service before it is sent to the media content client 126. In some embodiments, the media content client 126 may buffer and implement playback features of the content sent from the receiving device 118 such as pause, fast forward or rewind locally at the media content client 126 after the content has been received by the media content client 126 from the receiving device 118. In various embodiments, there is more than one media content client 126 in communication with the wireless access point 120, in which case each may receive the same or different TV programming and other media content from the receiving device 118 at the same time.

Figure 2:
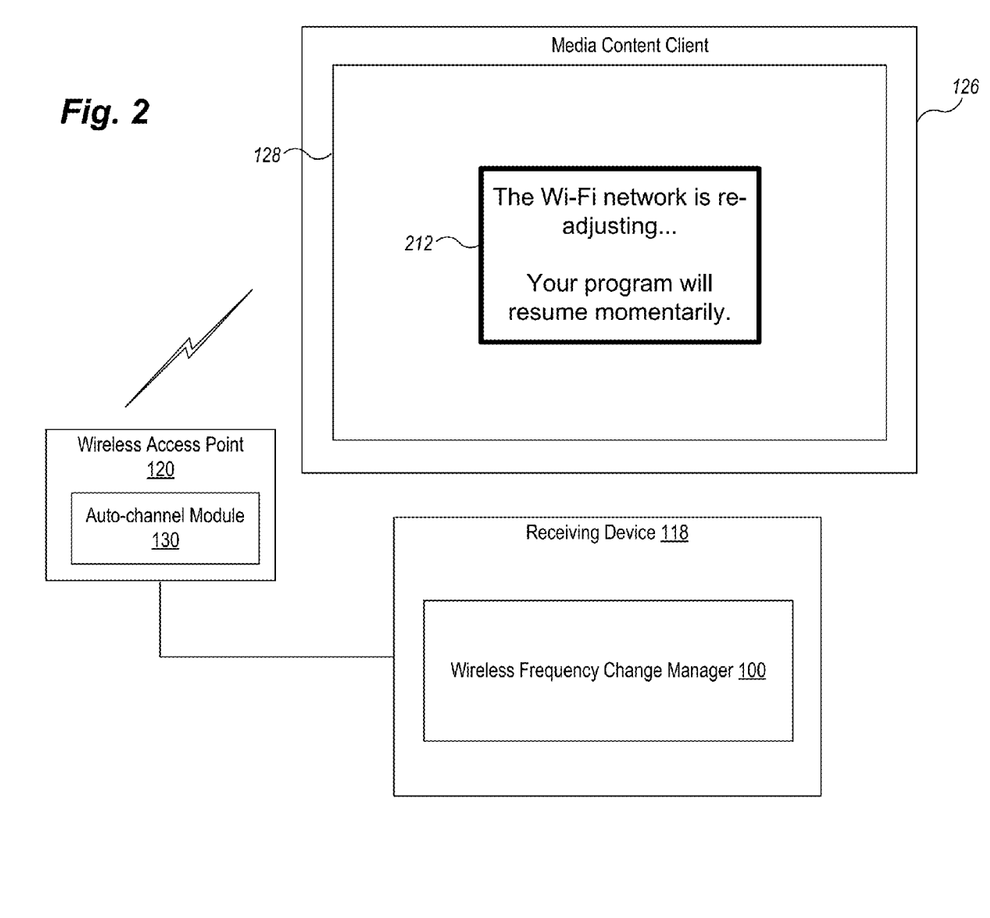
FIG. 2 is a block diagram illustrating example functional elements of systems and methods for handling interruptions in receiving media content due to a change in wireless frequency channel, according to one embodiment.

The presentation device 128 may be operably connected to or integrated with the media content client 126 (such as shown in FIG. 2). In some embodiments, the media content client 126 is a software module running on hardware connected to or integrated with the presentation device 128. For example, the media content client 126 may be, or be part of, a device such as a television converter, set-top box, television receiving device, television recording device, satellite set-top box, satellite receiving device, cable set-top box, cable receiving device, media player, mobile device, smart phone, computer, tablet device, and/or television tuner. Accordingly, the media content client 126 may be any suitable software, device or electronic equipment that is separate from the receiving device 118 and is operable to communicate with the receiving device 118 via a wireless access point, such as wireless access point 120, and receive media content from the receiving device 118 via the wireless access point.

The above description of the content distribution environment 102 and the customer premises 116, and the various devices therein, is intended as a broad, non-limiting overview of an example environment in which various embodiments of systems and methods for handling interruptions in receiving media content due to a change in wireless frequency channel may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement how a system handles interruptions in receiving media content due to a change in wireless frequency channel. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

FIG. 2 is a block diagram illustrating example functional elements of systems and methods for handling interruptions in receiving media content due to a change in wireless frequency channel, according to one embodiment.

In the illustrated example, a wireless frequency change manager 100 operates on the receiving device 118 and the auto-channel module 130 operates on the wireless access point 120. When the auto-channel module 130 determines to change to a DFS wireless frequency channel, the wireless access point 120 first sends a request to the receiving device frequency change manager 100 for authorization to change to the DFS wireless frequency channel. When the wireless frequency change manager 100 receives this request it may then send out an alert to the media content client 126 to inform the media content client 126 that a change to a DFS wireless frequency channel is occurring or about to occur. As mentioned above, there may be multiple media content clients in various embodiments, in which case an alert may be sent to each of these multiple media content clients. In some embodiments, in response to the request for the wireless access point 120 to change to the DFS wireless frequency channel and before the sending of the authorization, the wireless frequency change manager 100 operating on the receiving device 118 may initiate buffering or otherwise record media content data to send to the media content client 126 via the wireless access point 120 after the change to a DFS wireless frequency channel has completed. This is to help increase access, once the Wi-Fi connection becomes more stable, to more content starting from the point at which the instability in the Wi-Fi connection first began.

In response to the alert, the media content client 126 may perform an action to address a possible interruption in service due to the change to the DFS wireless frequency channel occurring.

For example, the media content client 126 may present a pop-up message to the user letting the user know that the Wi-Fi network is re-adjusting to avoid interference and will resume video momentarily or within a specified time period, such as a within a minute or other time period within which the procedure to change to the DFS wireless frequency channel is expected to be completed. For example, pop-up message 212 is displayed by the media content client 126 on presentation device 128 that states "The Wi-Fi network is re-adjusting . . . Your program will resume momentarily." However, other applicable messages, alerts, warnings, text, audio, colors or announcements may be provided, displayed or sent to the user. The media content client 126 will then send a message via the wireless access point 120 or otherwise inform the wireless frequency change manager 100 of the receiving device 118 that the applicable action or actions have begun or have been performed.

In some embodiments, when the media content client 126 provides a pop-up message or other communication to the user letting the user know that the Wi-Fi channel change is about to occur, the media content client 126 may provide the user an option to stop the Wi-Fi channel change from occurring. For example, this may be desirable in a situation where even though the wireless access point 120 is experiencing issues on the current Wi-Fi channel (e.g. interference/congestion) this may not be actually causing a bad video experience for the user.

After the applicable action or actions have begun or have been performed, the wireless frequency change manager 100 may then send an authorization back to the auto-channel module 130 of the wireless access point 120 authorizing the auto-channel module 130 to perform the applicable procedure, including a scan, to change to the DFS wireless frequency channel. While the wireless network provided by the wireless access point 120 is down for approximately a minute during the performance of the procedure to change to the DFS wireless frequency channel, the wireless frequency change manager 100 may cause the receiving device 118 to start buffering the media content or otherwise recording the media content streams to be sent to the media content client 126 and other possible media content clients on a digital video recorder (DVR) or other memory device that is part of or connected to the receiving device 118. After the change to the DFS wireless frequency channel is completed, when the network provided by the wireless access point 120 comes back up the wireless frequency change manager 100 may then start sending to the media content client 126 the buffered or otherwise recorded video content for the media content client 126 to start playing the buffered media content from the point it was at when the procedure to change to the DFS wireless frequency channel started to avoid the user missing any content.

In some embodiments, the media content client 126 may itself buffer media content as it is being received at a rate faster than real-time from the receiving device 118 via wireless access point 120 prior to the change to the DFS wireless frequency channel. In which case, in response to the alert from the receiving device 118 to the media content client 126 informing the media content client 126 that a change to a DFS wireless frequency channel is occurring or about to occur, the media content client 126 may continue or start playing media content stored in the buffer on the media content client 126 to avoid an appearance to the user of an interruption in service. This may continue during the change to the DFS wireless frequency channel and associated interruption in service from the receiving device 118 due to the Wi-Fi network provided by the wireless access point 120 being down until the buffer runs out, at which point the pop-up message 212 may be provided or other action may be performed to address the service interruption from the receiving device 118 if the network provided by the wireless access point 120 is still down due to the change to the DFS wireless frequency channel.

Figure 3:
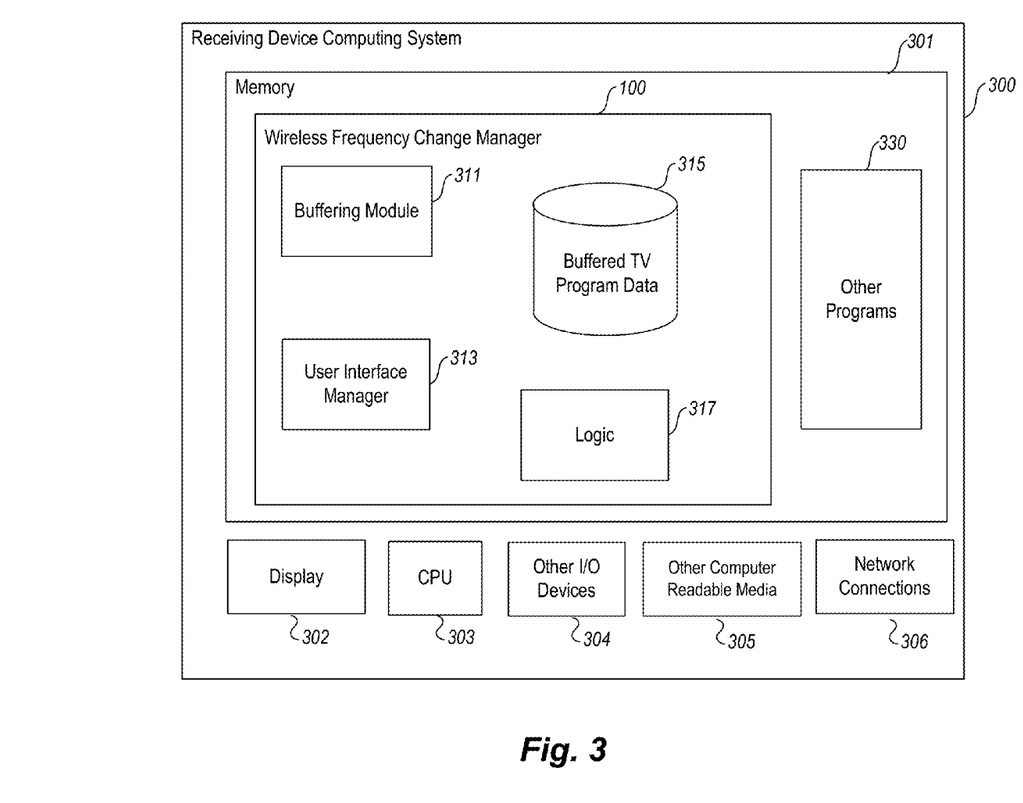
FIG. 3 is a block diagram of a computing system for practicing example embodiments of systems and methods for handling interruptions in receiving media content due to a change in wireless frequency channel, according to one embodiment.

FIG. 3 is a block diagram of a computing system for practicing example embodiments of systems and methods for handling interruptions in receiving media content due to a change in wireless frequency channel, according to one embodiment. FIG. 3 shows a receiving device computing system 300 that may be utilized to implement a wireless frequency change manager 100 of the receiving device 118. However, the same or similar computing system to that of computing system 300, or applicable components of the computing system 300, may be utilized by the media content client 126 to implement the functions of the media content client 126 described herein and/or utilized by the wireless access point 120 to implement the auto-channel module 130 and functions of the wireless access point described herein. In one embodiment, the receiving device computing system 300 is part of a set-top box configured to receive, buffer, record and display received media content, including programming, on a presentation device 124, such as that shown in FIG. 1, and to send the received media content to media content client 126 via wireless access point 120. In other embodiments, the receiving device computing system 300 is part of a presentation device, such as a television or a mobile device.

Note that one or more general purpose or special purpose computing systems/devices may be used to implement the wireless frequency change manager 100. In addition, the computing system 300 may comprise one or more distinct computing systems/devices and may span distributed locations. Furthermore, each block shown may represent one or more such blocks as appropriate to a specific embodiment or may be combined with other blocks. Also, the wireless frequency change manager 100 may be implemented in software, hardware, firmware, or in some combination to achieve the capabilities described herein.

In the embodiment shown, receiving device computing system 300 comprises a computer memory ("memory") 301, a user interface display 302, one or more Central Processing Units ("CPU") 303, Input/Output devices 304 (e.g., keyboard, mouse, RF or infrared receiving device, CRT or LCD display, and the like), other computer-readable media 305, and network connections 306. As mentioned above, the receiving device 118 may receive programming from the above-described receiving device antenna 114, and/or partially from, or entirely from, another source other than the above-described receiving device antenna 114. For example, some embodiments of the receiving device 118 may receive programming from program distributors 106 and/or content providers 104 via locally broadcast RF signals, cable, fiber optic, Internet media, or the like. Network connections 306 represent the interfaces, tuners, demodulators, demultiplexers, packet filters, network equipment, etc., of the receiving device that are configured and operable to receive data from and interface with the sources described herein, and convert the received signal(s) from these sources into a signal and/or format suitable for communication to a presentation device 124 or another device, such as media content client 126.

The wireless frequency change manager 100 is shown residing in memory 301. In other embodiments, some portion of the contents and some of or all of the components of the wireless frequency change manager 100 may be stored on and/or transmitted over the other computer-readable media 305. The components of the wireless frequency change manager 100 execute on one or more CPUs 303 and cause the buffering of media content data to occur, playback of media content to occur on presentation device 124 and communication with wireless access point 120 and with media content client 126 via wireless access point 120 to occur in a manner to handle interruptions in receiving media content due to a change in wireless frequency channel. The components of the wireless frequency change manager 100 also execute on one or more CPUs 303 in a manner to facilitate a user avoiding missing programming when the change to a different wireless frequency channel occurs.

Other code or programs 330 (e.g., an audio/video processing module, a TV program guide manager module, a Web server, and the like) and potentially other data repositories, also reside in the memory 301, and preferably execute on one or more CPUs 303. Of note, one or more of the components in FIG. 3 may not be present in any specific implementation. For example, some embodiments may not provide other computer readable media 305 or a display 302.

In some embodiments, the wireless frequency change manager 100 may include a buffering module 311, a user interface manager 313, a buffered program data repository 315 that includes buffered programming, and logic 317 that includes the program code to implement the processes of the wireless frequency change manager 100 described herein. Other and/or different modules may be implemented. The wireless frequency change manager 100 may interact via network connections 306 with the media content client 126 via wireless access point 120 shown in FIGS. 1 and 2, another home recording device (not shown), program distributor 106 shown in FIG. 1, and a home computing system (not shown), such as a desktop computer, a laptop computer, tablet computer, mobile device, etc.

The buffering module 311 provides the buffering functions of the wireless frequency change manager 100. For example, the buffering module 311 initiates and performs buffering of TV programming received on one or more TV channels, by directing TV program content received by the computing system 300 to be stored in buffered program data repository 315. In one embodiment, the buffering module 311 may also be configured to store the media content streams to be sent to the media content client 126 and other possible media content clients.

The user interface manager 313 provides a view and a controller that facilitate user interaction with the wireless frequency change manager 100 and its various components. For example, the user interface manager 313 provides interactive graphical user interface screens and/or elements to provide the user the ability to configure the wireless frequency change manager 100. For example, the use may configure the wireless frequency change manager 100 via the interactive graphical user interface to not authorize a change to a DFS wireless frequency channel in various circumstances, or may select whether to record and/or send buffered data to the media content client 126 for use when or after a change to a DFS wireless frequency channel occurs. In some embodiments, the wireless frequency change manager includes an application program interface ("API") that provides programmatic access to one or more functions of the wireless frequency change manager 100. For example, such an API may provide a TV programmatic interface to one or more functions of the wireless frequency change manager 100 that may be invoked by one of the other programs 330 or some other module of the receiving device 118. For example, the wireless frequency change manager 100 may be invoked or utilized by another program managing the overall operation of the receiving device 118 for receiving, sending and playing media content.

In an example embodiment, components or modules of the wireless frequency change manager 100 are implemented using standard programming techniques. For example, the wireless frequency change manager 100 may be implemented as a "native" executable running on the CPU 303, along with one or more static or dynamic libraries. In other embodiments, the wireless frequency change manager 100 may be implemented as instructions processed by a virtual machine that executes as one of the other programs 330. In general, a range of TV programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

In a software or firmware implementation, instructions stored in a memory cause, when executed, one or more processors of the computing system 300 to perform the functions of the wireless frequency change manager 100. For example, instructions stored in memory when executed by a computer processor modify the data in the same or another memory address space, thus performing the functions of the wireless frequency change manager 100. Alternatively instructions stored in memory when executed by a processor could modify the control registers of an application specific integrated circuit (ASIC) to configure it to perform the functions of the wireless frequency change manager 100. Such an ASIC may directly access and modify the memory of the computer processor without the intervention of the computer processor (DMA operation). In one embodiment, instructions, when executed cause the CPU 303 or some other processor, such as an I/O controller/processor, to buffer or otherwise record programming, such as by consuming program data and writing it to a disk or other storage device, by initiating a suitable DMA operation, or the like. Similarly, the CPU 303 or other processor may be configured to perform other operations such as recording and sending media content to the media content client 126.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Also, functions could be implemented and/or performed by each component/module, and in different orders, and by different components/modules, yet still achieve the functions of the wireless frequency change manager 100. For example, one way (broadcast) and/or two-way (interactive) wide area networks (WAN) may be used for content delivery. Utilizing two-way networks, the content may be buffered by the broadcaster on their equipment based on signalling returned via the WAN. Both types of networks may use storage local to the receiving device and under local control on the local area network (LAN).

In addition, programming interfaces to the data stored as part of the wireless frequency change manager 100, such as in the buffered program data repository 315, can be available by standard mechanisms such as through C, C++, C#, and Java APIs; libraries for accessing files, databases, or other data repositories; through scripting languages such as XML; or through Web servers, FTP servers, or other types of servers providing access to stored data. The buffered program data repository 315 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a wireless frequency change manager.

Furthermore, in some embodiments, some or all of the components of the wireless frequency change manager 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on, or transmitted/communicated by, various non-transitory or transitory computer-readable mediums (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

One or more of the same or similar computing system and implementation technologies described above with respect to computing system 300 and implementation of the wireless frequency change manager 100 may be utilized by the media content client 126 to implement the functions of the media content client 126 described herein and/or utilized by the wireless access point 120 to implement to auto-channel module 130 and functions of the wireless access point 120 described herein.

Figure 4:
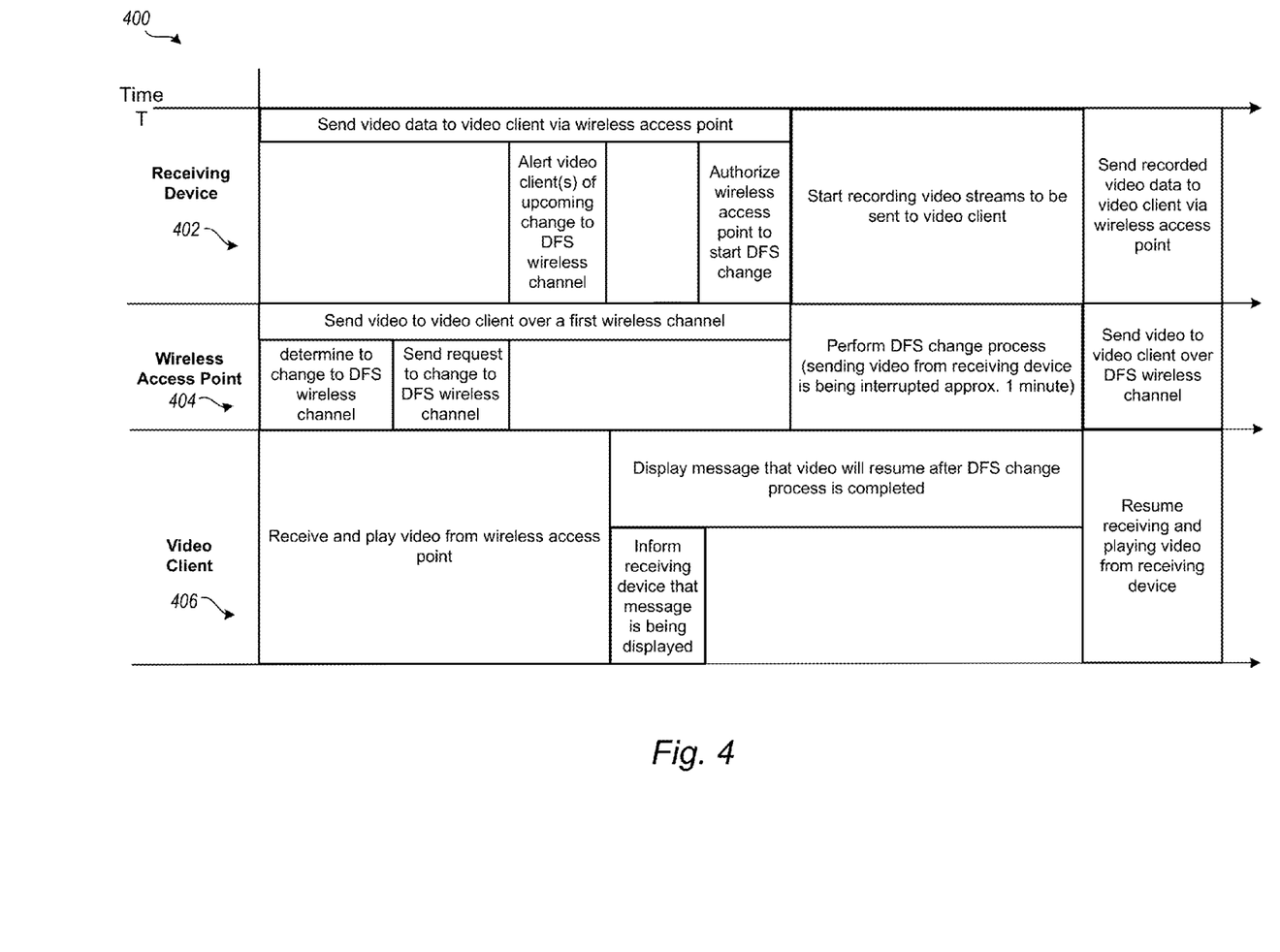
FIG. 4 is a timeline chart illustrating an example operation of a system for handling interruptions in receiving media content due to a change in wireless frequency channel, according to one embodiment.

FIG. 4 is a timeline chart 400 illustrating an example operation of a system for handling interruptions in receiving media content due to a change in wireless frequency channel, according to one embodiment.

Shown in FIG. 4 is an example receiving device timeline 402, wireless access point timeline 404 and video client timeline 406 illustrating operations occurring concurrently or in parallel on each of the respective devices. Note that in the embodiment shown in FIG. 4, the type of media content client being used is a video client that receives video content data from the receiving device 118 via wireless access point 120 as shown in FIGS. 1 and 2.

At the start of the receiving device timeline 402, wireless access point timeline 404 and video client timeline 406, the receiving device is sending video data to one or more video clients via wireless access point 404 over a first wireless channel. Also, as indicated in the video client timeline 406, the video client is receiving and playing this received video on a presentation device. As shown in the wireless access point timeline, while the receiving device is sending video data to one or more video clients via the wireless access point over the first wireless channel, the wireless access point determines to change to a second wireless channel that is a DFS wireless channel. This may be, for example, because there is interference on all the available non-DFS channels. In the present example, this first wireless channel is a non-DFS channel. In which case, when a change to the DFS wireless channel occurs, it is considered a "DFS re-entry." As shown in wireless access point timeline 404, the wireless access point then sends a request to the receiving device to change to the DFS wireless channel.

As shown in the receiving device timeline 402, in response to receiving this request from the wireless access point, the receiving device alerts the video client of the upcoming change to the DFS wireless channel. As shown in the video client timeline 406, the video client, in response to this alert, then presents a message (e.g., on a presentation devices connected to or integrated with the video client) that the video will resume after the DFS change process is completed and informs or otherwise confirms to the receiving device that the message is being displayed. Other or different actions may also be performed as described above to address the interruption in service at this point. As shown in the receiving device timeline 402, the receiving device then authorizes the wireless access point to start the procedure, including a scan, to change to the DFS wireless channel. This authorization may be a message or other signal to the wireless access point to allow the wireless access point to perform the procedure to change to the DFS wireless channel. In response to the authorization, the wireless access point then performs the DFS change process as shown in the wireless access point timeline 404. As this procedure to change to the DFS wireless channel will temporarily interrupt service by taking the Wi-Fi network down provided by the wireless access point for approximately a minute during the change, the receiving device starts buffering or otherwise recording the video stream to be sent to the video client if it is not already doing so, as shown in the receiving device timeline 402.

Although not shown in FIG. 4, the wireless access point may send a message to or otherwise inform the receiving device that the DFS change process is complete. Once the DFS change process is complete, the wireless network provided by the wireless access point becomes available again and, as shown in the receiving device timeline 402, the receiving device starts to send the recorded video data to the video client via the wireless access point so that the user of the video client may resume playing, and the user may continue to view, the video program from the point where the user left off when the DFS change process had started.

Figure 5:
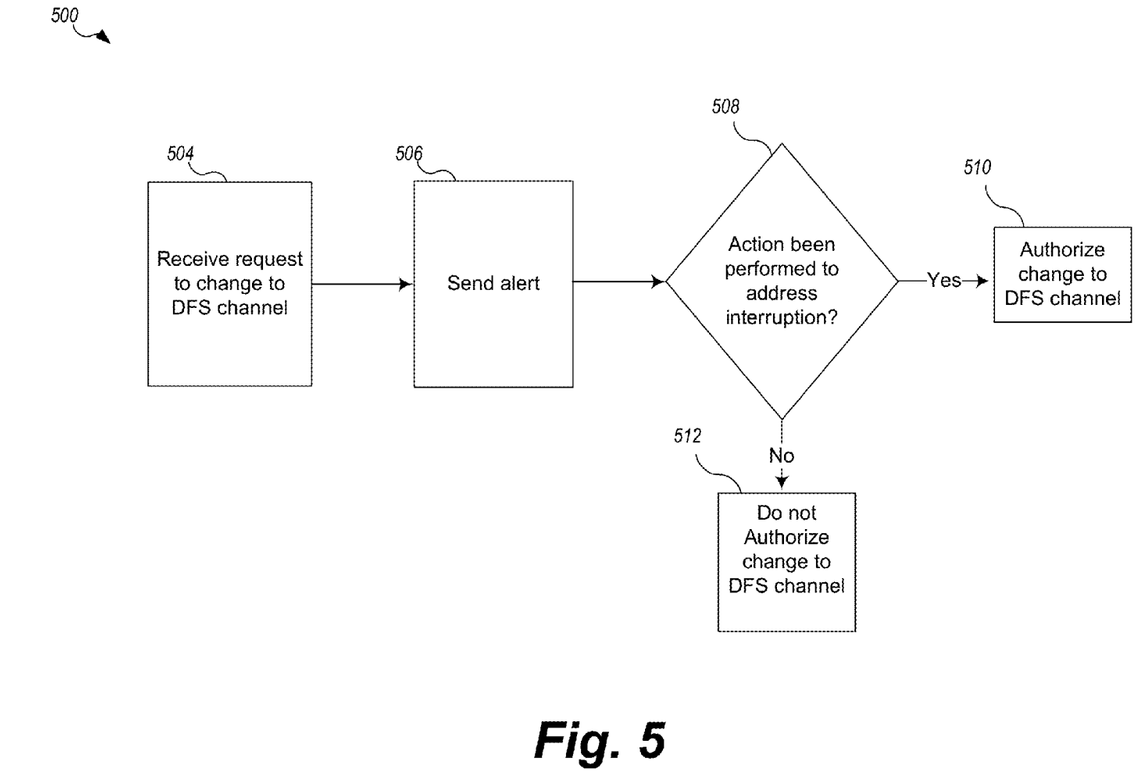
FIG. 5 is a flow diagram of an example method for handling interruptions in receiving media content due to a change in wireless frequency channel from the perspective of a receiving device, according to one embodiment.

FIG. 5 is a flow diagram of an example method 500 for handling interruptions in receiving media content due to a change in wireless frequency channel from the perspective of the receiving device 118, according to one embodiment.

At 504, the receiving device 118 receives a request to change to a DFS channel from a wireless access point.

At 506, in response to the request from the wireless access point to change to the DFS wireless frequency channel, the receiving device sends an alert to a media content client. For example, the alert may be regarding the upcoming expected change to the DFS wireless frequency channel.

At 508, the receiving device 118 determines whether an action has been performed to address the interruption in service. For example, the action may be the media content client displaying a message to a user regarding the interruption in service. This determination may be made by receiving a message from the media content client that the applicable action has been performed.

At 510, if the receiving device 118 has determined such an action has been performed, then the receiving device 118 authorizes the wireless access point to change to the DFS wireless frequency channel.

At 512, if the receiving device 118 has determined such an action has not been performed, then the receiving device 118 does not authorize the wireless access point to change to the DFS wireless frequency channel.

Figure 6:
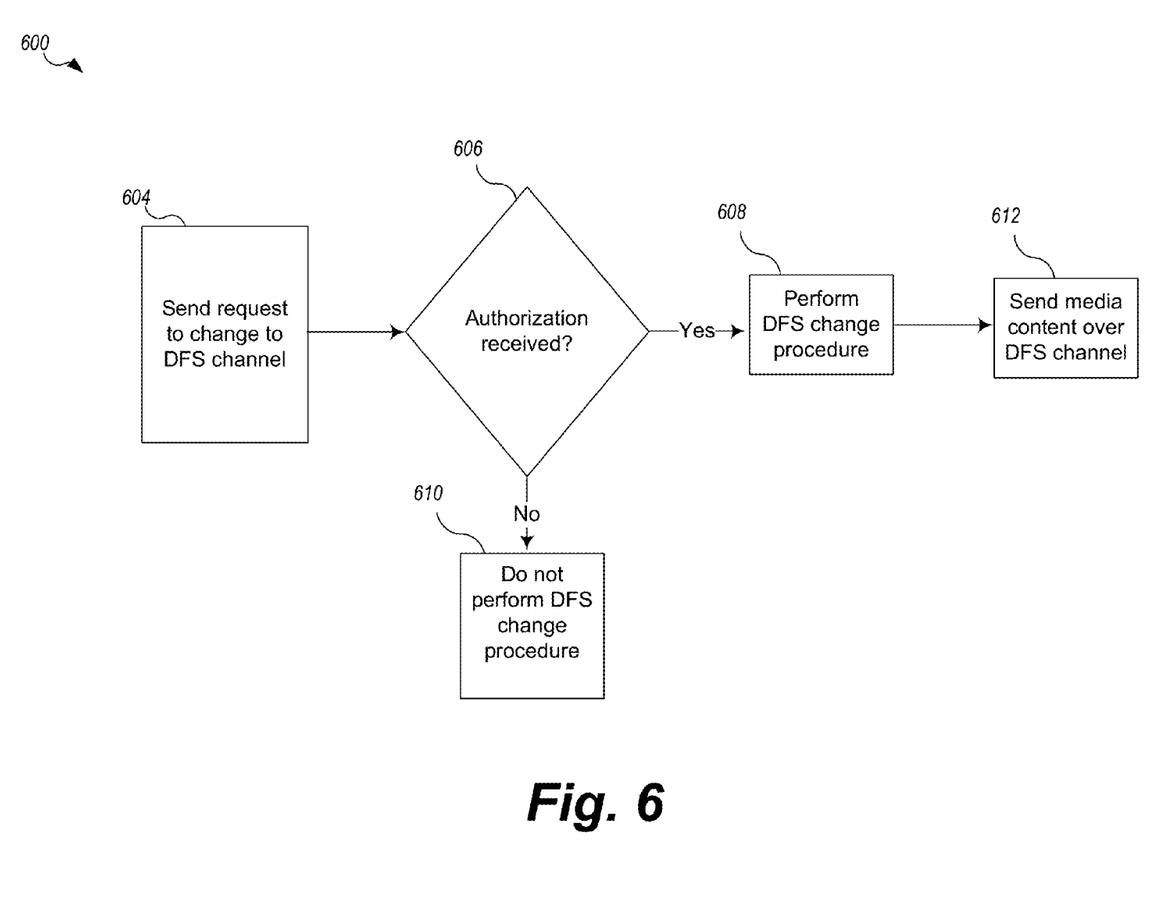
FIG. 6 is a flow diagram of an example method for handling interruptions in receiving media content due to a change in wireless frequency channel from the perspective of a wireless access point, according to one embodiment.

FIG. 6 is a flow diagram of an example method 600 for handling interruptions in receiving media content due to a change in wireless frequency channel from the perspective of the wireless access point 120, according to one embodiment.

At 604, the wireless access point 120 sends a request to the receiving device 118 to change to a DFS wireless frequency channel.

At 606, the wireless access point 120 determines whether an authorization has been received to make the change to a DFS wireless frequency channel in response to the request.

At 608, if the wireless access point 120 has determined that the authorization has been received, then the wireless access point 120 performs the change to the DFS wireless frequency channel.

At 610, if the wireless access point 120 has determined that the authorization has not been received, then the wireless access point 120 does not perform the change to the DFS wireless frequency channel.

At 612, after the wireless access point 120 performs the change to the DFS wireless frequency channel, then the wireless access point 120 sends media content over the DFS wireless frequency channel to the media content client 126.

Figure 7:
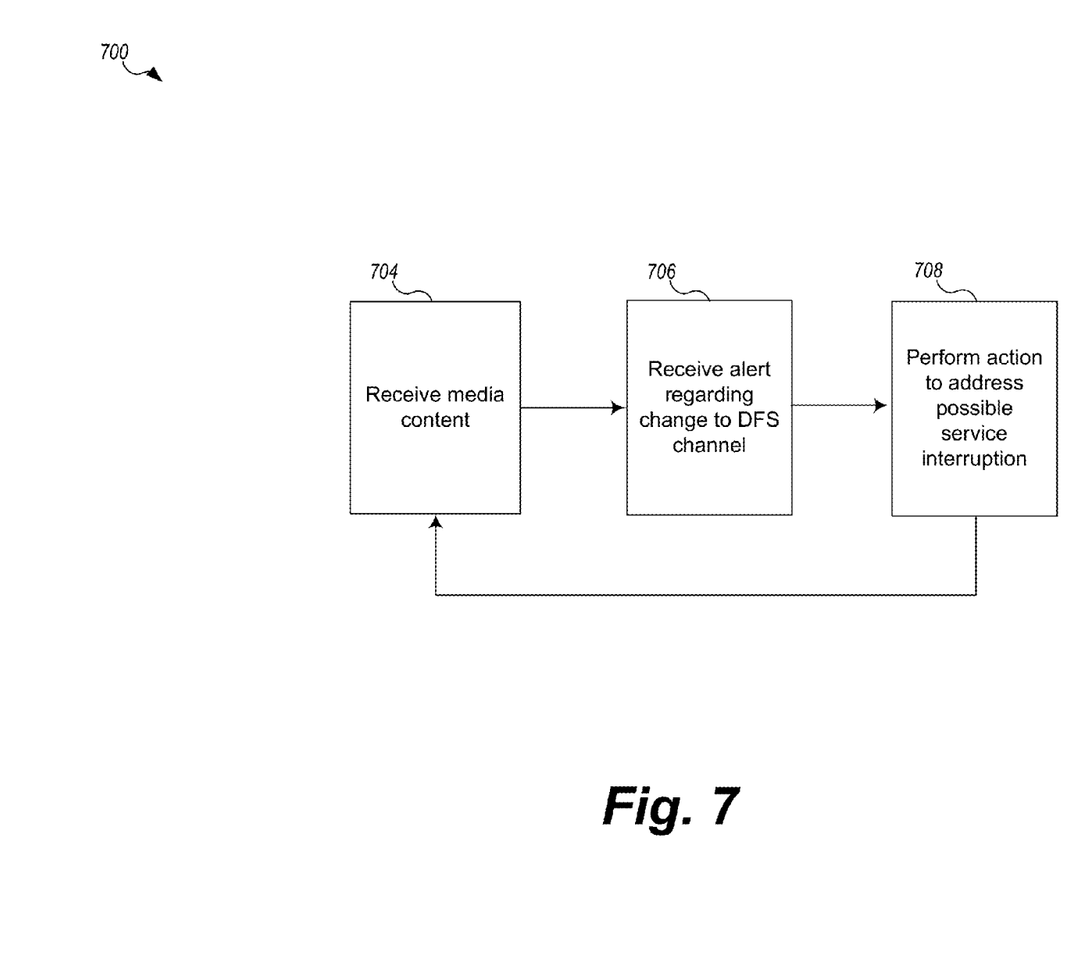
FIG. 7 is a flow diagram of an example method for handling interruptions in receiving media content due to a change in wireless frequency channel from the perspective of a media content client, according to one embodiment.

FIG. 7 is a flow diagram of an example method for handling interruptions in receiving media content due to a change in wireless frequency channel from the perspective of the media content client 126, according to one embodiment.

At 704, media content client 126 receives media content from the receiving device 118 via the wireless access point 120.

At 706, the media content client 126 receives an alert from the receiving device 118 regarding an upcoming interruption in service due to a change to a DFS wireless channel at the wireless access point 120.

At 708, the media content client 126 performs action to address the possible service interruption due to the change to a DFS wireless channel at the wireless access point 120. For example, the media content client 126 may present a pop-up message to the user letting the user know that the Wi-Fi network is re-adjusting to avoid interference and will resume video momentarily or within a specified time period, such as within a minute or other time period within which the procedure to change to the DFS wireless frequency channel is expected to be completed. However, other applicable messages, alerts, warnings, text, audio, colors or announcements may be provided, displayed or sent to the user. As part of the action to address possible service interruption, the media content client 126 may then send a message via the wireless access point 120 or otherwise inform the receiving device 118 that the applicable action or actions have begun or have been performed. In some alternative embodiments, the media content client 126 may continue or start playing media content stored in a buffer on the media content client 126 to avoid an appearance to the user of an interruption in service. After the service interruption is over, the process then returns to 704 to continue receiving media content from the receiving device 118.

While various embodiments have been described hereinabove, it is to be appreciated that various changes in form and detail may be made without departing from the spirit and scope of the invention(s) presently or hereafter claimed.

The invention claimed is:

1. A computer implemented method in a receiving device, the method comprising:
sending, by at least one computer processor, media content data to at least one media content client via a wireless access point over a first wireless frequency channel;
receiving, by at least one computer processor, a request for the wireless access point to change to a second wireless frequency channel that is a dynamic frequency selection (DFS) wireless frequency channel;
in response to the request for the wireless access point to change to the DFS wireless frequency channel, sending, by at least one computer processor, an alert to the at least one media content client;

in response to the sending of the alert, receiving, by at least one computer processor, a confirmation from the at least one media content client that an action has been performed in response to the alert to address an interruption in service due to the change to the DFS wireless frequency channel; and in response to receiving the confirmation that the action has been performed in response to the alert to address the interruption in service due to the change to the DFS wireless frequency channel, sending, by at least one computer processor, an authorization to the wireless access point to perform the change to the DFS wireless frequency channel.

2. The method of claim 1 further comprising:

in response to the request for the wireless access point to change to the DFS wireless frequency channel and before the sending of the authorization, start recording media content data to send to the at least one media content client via the wireless access point;

after the change to the DFS wireless frequency channel has been completed by the wireless access point, sending, by at least one computer processor, the recorded media content data to the at least one media content client via the wireless access point over the DFS wireless frequency channel.

3. The method of claim 2 further comprising:

receiving, by at least one computer processor, an indication from the wireless access point that the change to the DFS wireless frequency channel has been completed before the sending of the media content data to the at least one media content client via the wireless access point over the DFS wireless frequency channel.

4. The method of claim 1 wherein the action performed in response to the alert to address the interruption in service due to the change to the DFS wireless frequency channel is a communication of a message to at least one user of the at least one media content client regarding the interruption in service.

5. The method of claim 4 wherein the message is indicative that a service interruption is temporary and service is will resume.

6. The method of claim 1 further comprising:

sending, by at least one computer processor, buffered media content data to the at least one media content client prior to the interruption in service to play during the interruption in service to reduce an appearance of the interruption in service to a user.

7. The method of claim 1 wherein the action performed in response to the alert to address the interruption in service due to the change to the DFS wireless frequency channel is that of playing buffered media content data during the interruption in service to reduce an appearance of an interruption in service due to the change to the DFS wireless frequency channel.

8. The method of claim 1 wherein the media content data includes one or more of: video data and audio data.

9. The method of claim 1 wherein the wireless access point is part of the receiving device.

10. The method of claim 1 wherein the media content client is a software client.

11. The method of claim 1 wherein the first wireless frequency channel is not a dynamic frequency selection (DFS) wireless frequency channel.

12. A wireless access point comprising:

at least one computer processor;

at least one wireless communications module coupled to the at least one computer processor; and a memory coupled to the at least one computer processor, wherein the memory has computer-executable instructions stored thereon, that when executed, cause the at least one processor to:

send, using the at least one wireless communications module, media content data from a receiving device to at least one media content client over a first wireless frequency channel;

determine to change to a second wireless frequency channel that is a dynamic frequency selection (DFS) wireless frequency channel;

send a request to the receiving device for authorization to change to the DFS wireless frequency channel;

in response to the sending the request to the receiving device for authorization to change to the DFS wireless frequency channel, receive an authorization from the receiving device to change to the DFS wireless frequency channel based on an action having been performed to address an interruption in service due to the change to the DFS wireless frequency channel;

in response to receiving the authorization from the receiving device to change to the DFS wireless frequency channel, perform a procedure to change to the DFS wireless frequency channel; and after the change to the DFS wireless frequency channel has been completed, send, using the at least one wireless communications module, media content data to the at least one media content client over the DFS wireless frequency channel.

13. The wireless access point of claim 12 wherein the performance of the procedure to change to the DFS wireless frequency channel includes checking that the DFS wireless frequency channel is free of radar signals.

14. The wireless access point of claim 12 wherein determination to change to a second wireless frequency channel that is a DFS wireless frequency channel includes:

determining to change to another wireless frequency channel than the first wireless frequency channel to avoid interference;

determining whether there are other available wireless frequency channels to change to that are not DFS wireless frequency channels;

determining to change to the second wireless frequency channel that is a DFS wireless frequency channel based on a determination that there are no other available wireless frequency channels to change to that are not DFS wireless frequency channels.

15. The wireless access point of claim 12 wherein the first wireless frequency channel is not a dynamic frequency selection (DFS) wireless frequency channel.

16. A non-transitory computer-readable storage medium having computer-executable instructions thereon that, when executed by at least one computer processor, cause at least one computer processor to:

receive media content data from a receiving device via a wireless access point over a first wireless frequency channel;

receive an alert from the receiving device regarding an interruption in service due to a change at the wireless access point from using the first wireless frequency channel to using a second wireless frequency channel that is a dynamic frequency selection (DFS) wireless frequency channel; and in response to receiving the alert regarding the interruption in service due to the change from using the first wireless frequency channel to using the DFS wireless frequency channel, perform an action to address the interruption in service due to the change to the DFS wireless frequency channel.

17. The non-transitory computer-readable storage medium of claim 16 wherein the performing the action to address the interruption in service due to the change to the DFS wireless frequency channel includes communication of a message to at least one user of the at least one media content client indicative that a service interruption is temporary and service is will resume.

18. The non-transitory computer-readable storage medium of claim 16 wherein the performing the action to address the interruption in service due to the change to the DFS wireless frequency channel includes playing buffered media content during the interruption in service to reduce an appearance of an interruption in service due to the change to the DFS wireless frequency channel.

19. The non-transitory computer-readable storage medium of claim 16 wherein the computer-executable instructions, when executed by at least one computer processor, further cause at least one computer processor to:
after the service interruption due to the change at the wireless access point from using the first wireless frequency channel to using the second wireless frequency channel that is a DFS wireless frequency channel has ended, resume playing, using buffered media content data, the media content data from a point at which the service interruption started.

20. The non-transitory computer-readable storage medium of claim 19 wherein the computer-executable instructions, when executed by at least one computer processor, further cause at least one computer processor to:
after the service interruption due to the change at the wireless access point from using the first wireless frequency channel to using the second wireless frequency channel that is a DFS wireless frequency channel has ended, receive media content data from the receiving device via the wireless access point over the second wireless frequency channel that is a DFS wireless frequency channel; and
play the media content data received from the receiving device via the wireless access point over the second wireless frequency channel that is a DFS wireless frequency channel.

21. The non-transitory computer-readable storage medium of claim 16 wherein the performing the action to address the interruption in service due to the change to the DFS wireless frequency channel includes providing at least one user of the at least one media content client an option to stop the change to the DFS wireless frequency channel from occurring.

* * * * *